US Patent 3,546,175 — Patented Dec. 8, 1970

3,546,175
SOLUBLE POLYIMIDES PREPARED FROM 2,4-DIAMINOISOPROPYLBENZENE AND PYROMELLITIC DIANHYDRIDE AND 3,4,3',4'-BENZOPHENONETETRACARBOXYLIC DIANHYDRIDE

Rudolph J. Angelo, Wilmington, Del., assignor to E. I. du Pont de Nemours and Company, Wilmington, Del., a corporation of Delaware
No Drawing. Continuation-in-part of application Ser. No. 660,903, Aug. 16, 1967, which is a continuation of application Ser. No. 323,232, Nov. 13, 1963. This application June 9, 1969, Ser. No. 831,746
Int. Cl. C08g 20/32
U.S. Cl. 260—65                               2 Claims

ABSTRACT OF THE DISCLOSURE

Soluble polyimides and solutions thereof, of pyromellitic dianhydride or 3,4,3¹,4¹-benzophenonetetracarboxylic dianhydride and 2,4-diaminoisopropylbenzene, said polyimides being useful in coating compositions, as films, and the like.

RELATED APPLICATION

The present application is a continuation-in-part of copending application Ser. No. 660,930 (filed Aug 16, 1967) and now abandoned which is in turn a continuation of application Ser. No. 323,232, filed Nov. 13, 1963 and now abandoned.

SUMMARY

The polyimides of the present invention are characterized by a recurring unit having the following structural formula

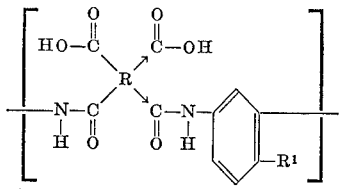

where R is

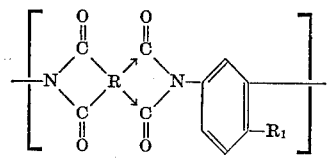

or

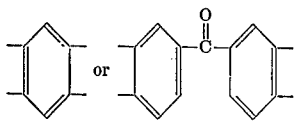

and $R^1$ is isopropyl, and the arrows denote isomerism.

These polyimides display outstanding physical and chemical properties which make them very useful as shaped structures such as self-supporting films, fibers, filaments and the like or for coating other materials. The structures are characterized by high tensile properties, desirable electric properties and surprising stability to heat and water. These polyimides have been found to be soluble to the extent of at least 5% in the well-known polyamide solvents, e.g., the N,N-dialkylcarboxylamide class of solvents and the like. Hence, these polyimides can be used in solution as coating compositions and in the formation of shaped articles by direct methods.

The polyimides are prepared by reacting 2,4-diaminoisopropylbenzene with pyromellitic dianhydride or 3,4,3¹,4¹-benzophenonetetracarboxylic dianhydride in an organic solvent for at least one of the reactants, the solvent being inert to the reactants, preferably under anhydrous conditions, for a time and at a temperature sufficient to provide a polyamide-acid having the recurring unit:

$$\left[ \begin{array}{c} \text{HO-C} \overset{O}{\underset{}{\parallel}} \quad \overset{O}{\underset{}{\parallel}} \text{C-OH} \\ \text{-N-C} \underset{\parallel}{\overset{\nearrow R \searrow}{}} \text{C-N-} \\ \text{H} \quad \text{O} \quad \text{O} \quad \text{H} \quad -R^1 \end{array} \right]$$

where R and $R^1$ are as hereinbefore defined.

It should be understood that it is not necessary that the polymeric component of the composition be composed entirely of the polyamide-acid. This is particularly true since conversion to the polyimide is contemplated subsequently. Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired and the minimum period of time that one desires for the reaction. For the combination of diamine and dianhydrides given above, it is possible to form compositions of 100% polyamide-acid by conducting the reaction below 100° C. However, temperatures up to 175° C. may be tolerated to provide acceptable compositions. The limiting factor may only be the boiling point of the solvent.

The degree of polymerization of the polyamide-acid and/or polyimide is subject to deliberate control. The use of equal molar amounts of the reactants under the prescribed conditions provides polymers of very high molecular weight. The use of either reactant in large excess limits the extent of polymerization. Besides using an excess of one reactant to limit the molecular weight of the polymer, a chain terminating agent such as phthalic anhydride may be used to "cap" the ends of the polymer chains.

In the preparation of the polymer, it is essential that the molecular weight be such that the inherent viscosity of the polymer is at least 0.1, preferably 0.3–5.0. The inherent viscosity is measured at 30° C. at a concentration of 0.5% by weight of the polymer in a sutiable solvent, e.g. N,N-dimethylacetamide. To calculate inherent viscosity, the viscosity of the polymer solution is measured relative to that of the solvent alone.

Inherent viscosity $$= \frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 5.0–40% of the polymeric component.

The normally liquid organic solvents of the N,N-dialkylcarboxylamide class are useful as solvents in this solution polymerization process. The preferred solvents are N,N-dimethylformamide and N,N-dimethylacetamide. They may easily be removed from the polyamide-acid and/or polymeric shaped articles by evaporation, displacement or diffusion. The solvents can be used alone and in mixtures. Alone or in mixtures, it has been found that these same solvents will also dissolve the specified polyimides to the extent of at least 5% at 25° C.

If the compositions still contain polyamide-acid, they may be converted to the respective polyimide compositions by any one or more of several processes. One process comprises converting the polyamide-acid polymer to polyimide by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion and if it is not desired to obtain the polyimide dissolved in a solvent directly, if the polyimide is further heated to a temperature of 300°–500° C. for a short interval (15 seconds to 2 minutes), improvements in the thermal and hydrolytic stabilities of the polyimide are obtained as well as an increase in inherent viscosity.

The preferred process for converting polyamide-acid to the corresponding polyimide is a chemical treatment and involves treating the polyamide-acid composition with a dehydrating agent alone or in combination with a tertiary amine, e.g. acetic anhydride or an acetic anhydride-pyridine mixture. The polyamide-acid composition is treated in solution with the acetic anhydride-pyridine mixture. The ratio of acetic anhydride to pyridine may vary from just above zero to infinite mixtures. It is believed that the pyridine functions as a catalyst for the action of the cyclyzing agent, the acetic anhydride. In this way, the polyimide in solution is obtained directly.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketones (ketone and dimethyl ketone). The preferred fatty acid anhydrides are acetic anhydride and ketone. Ketones are regarded as anhydrides of carboxylic acids, (ref. Bernthsen-Sudborough, textbook of Organic Chemistry, Van Nostrand 1935, page 861 and Hackh's Chemical Dictionary, Blakiston 1953, page 468) derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g., hemellitic, 3,4-xylic, isoxylic and mesitylenic acids; veratric acid; trmethoxybenzoic acid; alpha- and beta-naphthoic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts. As stated previously, the amine functions as a catalyst for the action of the cyclyzing agent, the anhydride.

As a third process of conversion, a combination treatment may be used. The polyamide-acid may be partially converted to the polyimide in a chemical conversion treatment and then cyclization to the polyimide may be completed by subsequent heat treatment.

The presence of polyimide is apparent if the polyamide-acid compositions are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates.

The polyimide compositions may be stored at this point for later use or they may be immediately used to form shaped articles. The polyimide solutions of this invention have several advantages over solutions of polyimide precursors, e.g., polyamide-acids, polyamide-esters, etc. There is no fear that they will convert to polyimide upon storage and, thus, precipitate out of solution. Since these solutions involve soluble polyimides, the conditions of storage, shipping, handling, etc. are not very critical. Yet the polyimides as shaped articles, coatings, etc. display the excellent properties of polyimides, i.e. thermal stability, hydrolytic stability, strength, etc.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the polymer in solution before shaping. Certain abrasives and electrically conductive materials are better added as surface layers. A cellular form or foam of the polyimide may be produced by adding a conventional blowing agent to the polymer solution either alone or in combination with a filler, followed by heating to decompose the agent. Alternatively, cellular products can be made by dispersing bubbles (or air, carbon dioxide, nitrogen, etc.) into a solution of the polyimide before shaping.

Instead of being shaped itself, the polyimide solution can be used as a coating composition. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, other polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the polyimide can be laminated to any of the above substrates, often with the aid of a commercially available adhesive.

The invention will be more clearly understood by referring to the examples which follow, Example 1 representing the best mode contemplated for practicing the invention. It is understood that the examples, although illustrating specific embodiments of the present invention, should not be considered limitative of the invention.

In the examples, inherent viscosity is measured at room temperature on a 0.5% solution in N,N-dimethylformamide.

Thermal stability is determined by heating a sample of the polymer in dry air from room temperature to 400° C. at a steady rate of 3° C. per minute and measuring the percent weight loss. A percent weight loss of less than 10% is considered good. A percent weight loss of less than 5% is considered excellent.

Electrical resistivity is measured by a method similar to that of ASTM method D–257–54T, using equipment modified in conventional ways to provide for measuring low resistivities:

A piece of film 2.5 x 3.5 cm. is used for the test. Silver electrodes are applied on top and bottom of the film to a distance of 0.5 cm. from each of the long ends. This gives a square of film 2.5 cm. x 2.5 cm. between the electrodes. The resistance between the electrodes is then measured by attaching the leads from a Simpson meter to each end of the film. This gives the resistance in ohms/square. The electrical resistivity is found by multiplying this value by the film thickness expressed in centimeters to give the units ohm-cm.

Methods for determining dielectric constant and dissipation factor are described in an ASTM method entitled "Tests for Dielectric Constant of Electrical Insulation (D150)." They are measured at room temperature (23° C.).

Example 1

To a solution of 3.75 grams (.025 mole) of 2,4-diamino isopropylbenzene in 36.8 grams of freshly distilled N,N-dimethylformamide is added 5.45 grams (.025 mole) of pyromellitic dianhydride. The dianhydride is added as a dry powder intermittently over a period of about 30 minutes. Adequate stirring is provided to mix the increasingly more viscous reaction mixture, and a slight rise in temperature is noted. As the last 2 grams of the dianhydride are added, the solution becomes extremely viscous and difficult to stir. At this point, an additional 10 grams of N,N-dimethylformamide is added, thus, yielding a 20% solids solution. The resulting polymer, predominantly polyamide-acid, has an inherent viscosity of 1.32 when measured at room temperature as a 0.5% solution in N,N-dimethylformamide. This polymer is converted in solution to the corresponding polyimide by the addition of a mixture of 5.1 grams of acetic anhydride and 5 ml. of pyridine. The resulting polyimide has an inherent viscosity of 1.17 and a solubility in N,N-dimethylformamide at 20° C. of greater than 10%. This polyimide solution is cast into a film having good physical properties as shown below:

| | |
|---|---|
| Tensile modulus (p.s.i.) | 328,000 |
| Elongation (percent) | 13.7 |
| Tensile strength (p.s.i.) | 11,600 |
| Dielectric constant (1000 c.p.s.) | 3.3 |
| Dissipation factor (1000 c.p.s.) | 0.006–0.016 |
| Electrical resistivity (ohm-cm.) | $>10^{15}$ |
| Thermal stability (percent weight loss) | 4.5 |

Example 2

A film of the polyimide prepared substantially according to the procedure of Example 1 is redissolved in N,N-dimethylformamide and recast as a film. The polymer, after being redissolved has an inherent viscosity of 0.74. The film properties are substantially those presented for Example 1. The polyimide is also soluble in N,N-dimethylacetamide.

Example 3

The procedure of Example 1 is generally followed except 3,4,3',4'-benzophenone tetracarboxylic dianhydride is substituted for the pyromellitic dianhydride. The resulting polyimide is soluble in N,N-dimethylacetamide at 20° C. to the extent of at least 5%.

Example 4

The solubility of the polypyromellitimide of Example 1 (derived from 2,4-diaminoisopropylbenzene) in dimethylacetamide (DMAC) and dimethylforamide (DMF) was demonstrated by treating film samples thereof of about ½-inch x ½-inch dimension with about 2 ml. of the indicated solvents at room temperature. Each test sample was found to be readily soluble at room temperature with stirring in each of DMAC and DMF.

The same solubility experiments were repeated using control samples of film of the polypyromellitimide of 4,6-dimethyl-1,3-diaminobenzene (a xylene diamine). The control samples were insoluble in both DMAC and DMF at room temperature, and the same control samples were also insoluble in these solvents when heated to 60° C.

What is claimed is:
1. A shapeable polyimide polymer consisting essentially of recurring units of

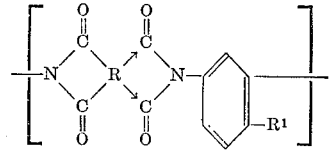

wherein R is a tetravalent aromatic radical of the group consisting of

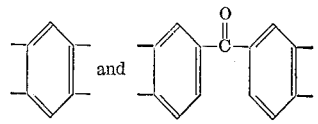

and $R^1$ is isopropyl, the polymer having an inherent viscosity of about 0.1 to 5.0 when measured on a 0.5 percent by weight solution of said polymer in N,N-dimethylformamide at 30° C., said polyimide polymer being soluble in N,N-dimethylformamide and N,N-dimethylacetamide to at least 5 percent by weight at 25° C.

2. A self-supporting film of the polymer of claim 1.

References Cited

UNITED STATES PATENTS

| | | | |
|---|---|---|---|
| 2,710,853 | 6/1955 | Edwards | 260—78 |
| 3,037,966 | 6/1962 | Chow | 260—32.6 |

WILLIAM H. SHORT, Primary Examiner

L. L. LEE, Assistant Examiner

U.S. Cl. X.R.

117—124, 126, 128.4, 132, 138.8, 145, 148, 155, 161; 261—197, 205, 214, 227; 260—2.5, 32.6, 37, 38